(12) United States Patent
Nellen

(10) Patent No.: US 9,738,142 B2
(45) Date of Patent: Aug. 22, 2017

(54) ROOF ASSEMBLY FOR A VEHICLE

(71) Applicant: Inalfa Roof Systems Group B.V., Oostrum (NL)

(72) Inventor: Marcel Johan Christiaan Nellen, Merselo (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 15/131,847

(22) Filed: Apr. 18, 2016

(65) Prior Publication Data
US 2016/0303956 A1 Oct. 20, 2016

(30) Foreign Application Priority Data
Apr. 20, 2015 (EP) .................................. 15164220

(51) Int. Cl.
*B60J 7/057* (2006.01)
*B60J 7/02* (2006.01)
*B60J 7/043* (2006.01)

(52) U.S. Cl.
CPC .............. *B60J 7/057* (2013.01); *B60J 7/022* (2013.01); *B60J 7/024* (2013.01); *B60J 7/0435* (2013.01)

(58) Field of Classification Search
CPC . B60J 7/057; B60J 7/0435; B60J 7/022; B60J 7/024
USPC .................... 296/216.05, 216.04, 222, 223
See application file for complete search history.

(56) References Cited

U.S. PATENT DOCUMENTS

| 4,671,565 | A | * | 6/1987 | Grimm | ................... B60J 7/057 296/213 |
| 5,238,290 | A | | 8/1993 | Farmont | |
| 5,288,125 | A | | 2/1994 | Huyer | |
| 5,618,081 | A | | 4/1997 | Nabuurs | |
| 5,765,907 | A | | 6/1998 | Nabuurs | |
| 2003/0080591 | A1 | | 5/2003 | De Gaillard | |
| 2006/0012224 | A1 | * | 1/2006 | Boehm | ................. B60J 7/0435 296/223 |

(Continued)

FOREIGN PATENT DOCUMENTS

DE 4101288 A1 7/1991
EP 0437283 A1 7/1991

(Continued)

OTHER PUBLICATIONS

European Search report for corresponding European patent application No. 15164220.4, dated Sep. 21, 2015.

*Primary Examiner* — Jason S Morrow
*Assistant Examiner* — E Turner Hicks
(74) *Attorney, Agent, or Firm* — Steven M. Koehler; Westman, Champlin & Koehler, P.A.

(57) ABSTRACT

A roof assembly for a vehicle, having a roof opening in its fixed roof, comprises at least one movable panel closing said roof opening in its closed position and being movable from said closed position rearwardly and upwardly above the fixed roof. A driven operating mechanism supports the panel and comprises a telescope including a first telescopic part attached to the panel and a second telescopic part attached to a remainder of the operating mechanism. A height adjusting mechanism is provided between the panel and the operating mechanism. This height adjusting mechanism is arranged and adjusts the height between the first and second telescopic parts.

16 Claims, 3 Drawing Sheets

(56) References Cited

U.S. PATENT DOCUMENTS

| | | | |
|---|---|---|---|
| 2011/0233971 A1* | 9/2011 | Nellen | B60J 7/02 296/222 |
| 2012/0068503 A1* | 3/2012 | Uehara | B60J 7/0435 296/222 |
| 2015/0165882 A1 | 6/2015 | Manders | |

FOREIGN PATENT DOCUMENTS

| | | |
|---|---|---|
| EP | 0543427 A1 | 5/1993 |
| EP | 0657316 A1 | 6/1995 |
| EP | 1293370 A2 | 3/2003 |
| EP | 2368735 A1 | 9/2011 |

* cited by examiner

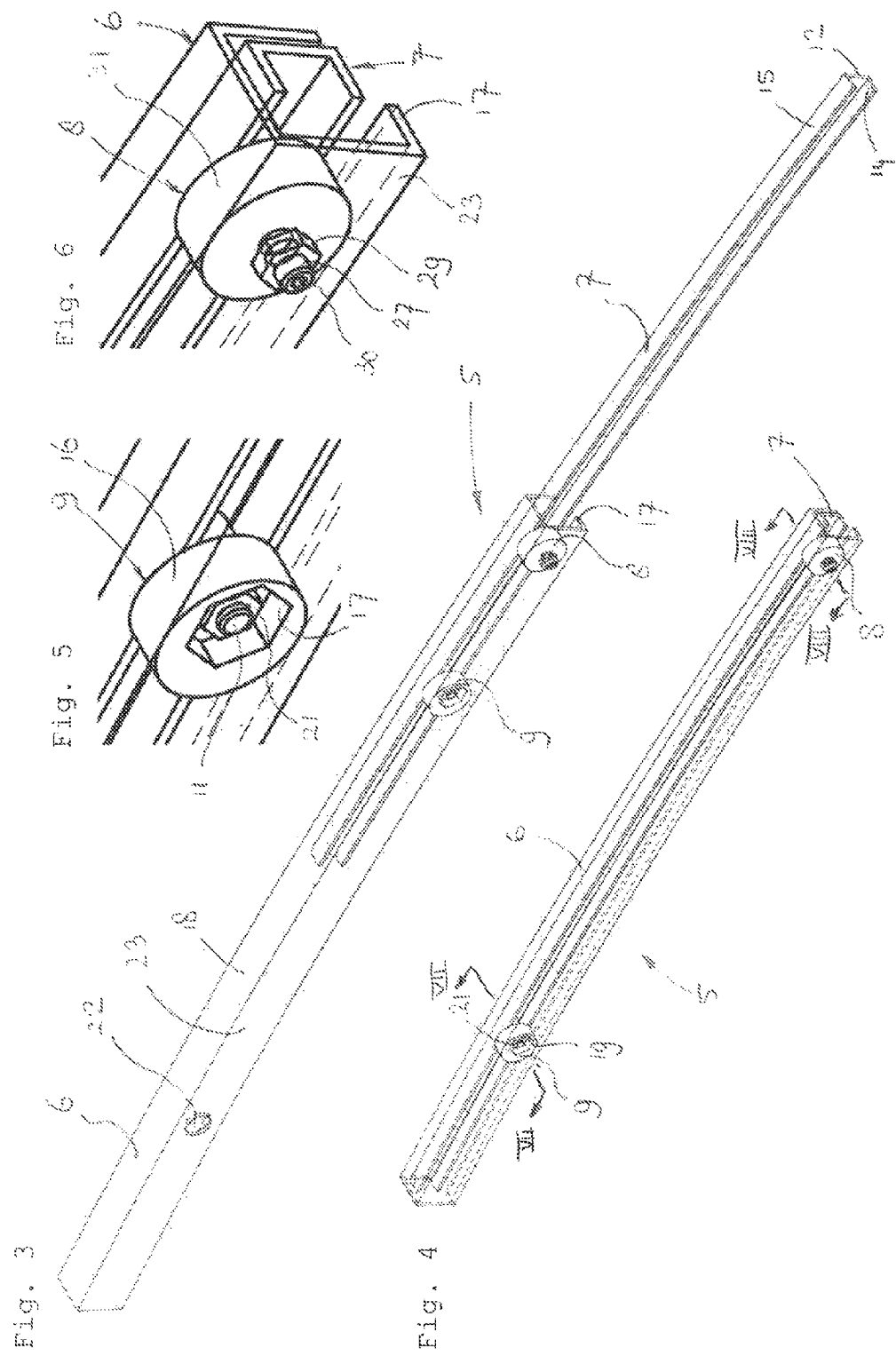

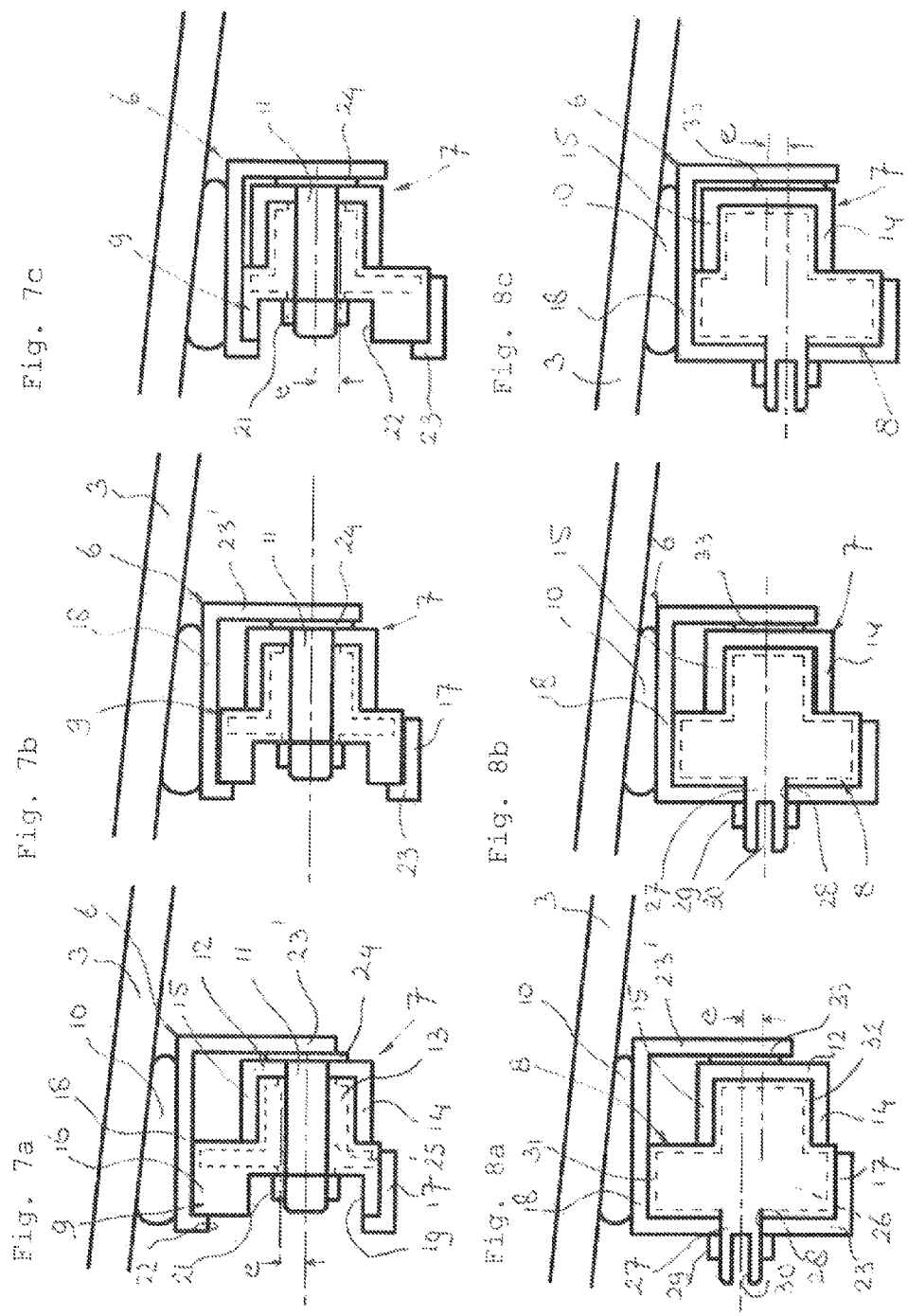

ROOF ASSEMBLY FOR A VEHICLE

BACKGROUND

The discussion below is merely provided for general background information and is not intended to be used as an aid in determining the scope of the claimed subject matter.

Aspects of the present invention relate to a roof assembly for a vehicle, having a roof opening in its fixed roof, comprising a frame, at least one movable panel closing said roof opening in its closed position and being movable from said closed position rearwardly and upwardly above the fixed roof, and a driven operating mechanism which is supported by the frame and supports the panel, the operating mechanism comprising a telescope including a first telescopic part attached to the panel and a second telescopic part attached to a remainder of the operating mechanism, a height adjusting mechanism being provided between the panel and the operating mechanism.

A roof assembly, also known as a telescopic spoiler roof, is known, for example from a roof assembly used in the Land Rover Freelander 1, which was in production from 1997-2003. A problem in the prior art roofs is the height adjustment of the panel with respect to the surrounding (fixed) roof parts. This height can differ due to production tolerances or tolerances in the attachment of the roof assembly to the vehicle, in particular passenger car. In the prior art roof assembly the outer telescopic part is fixed to the panel through a separate bracket that is adjustable with respect to the outer telescopic part. This bracket adds height to the package in vertical (Z) direction, which is often a problem.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

According to one aspect of the invention a height adjusting mechanism is arranged and adjusts the height between first and second telescopic parts of a telescopic spoiler roof.

By integrating the height adjusting mechanism within the telescope, it is possible to reduce the total height as the first telescopic part can be fixed directly to the panel without interposed height adjusting mechanism. The total height of the telescope and height adjusting mechanism can be minimized if they are arranged substantially side-by-side, or in other words between the first and second telescopic parts in a lateral direction. There is normally more space available in the lateral direction than in a vertical direction. In this arrangement, the height adjusting mechanism will preferably be positioned below an upper portion of the first telescopic part of the telescope.

In one embodiment, the first telescopic part is guided with respect to the second telescopic part by at least one slide shoe, the height position of the slide shoe with respect to one of the telescopic parts being adjustable.

So in this embodiment the slide shoe has two functions, i.e. to movably support the telescopic parts at least in a vertical direction and to act at least partly as a height adjusting mechanism.

The slide shoe may include a pivoting axis and eccentric sliding surfaces to adjust the height.

In this embodiment, the slide shoe may be pivoted or rotated around the pivoting axis. The height of the eccentric sliding surfaces will then be changed thereby adjusting the height of the first telescopic part and consequently of the panel.

For example, the first and second telescopic parts include a first and second slide shoe, the first slide shoe being attached to the first telescopic part, and the second slide shoe being attached to the second telescopic part.

The first telescopic part may be an outer telescopic part and the second telescopic part may be an inner telescopic part, the first slide shoe may be the front slide shoe attached to the outer telescopic part and the second slide shoe may be the rear slide shoe attached to the inner telescopic part.

In this manner, the front and rear slide shoes will provide a natural stop for the outward movement between the first and second telescopic parts.

In a particular embodiment, the second telescopic part is a U-shaped section turned 90 degrees with the open area of the section oriented toward the interior of the telescope, and wherein the first telescopic part is extending outwardly of the second telescopic part, the slide shoes being positioned between the open area of the first telescopic part and the second telescopic part.

The at least one slide shoe may comprise a circular outer circumference having a transverse axis which is positioned eccentrically with respect to the pivoting axis of the eccentric slide shoe.

During assembly, the at least one eccentric slide shoe may be adjusted by a first tool and may be secured by a second tool.

Preferably, at least one slide pad is provided between the first and second telescopic parts.

There may be provided a slide pad only in the areas of the slide shoes, each slide pad being attached to one of the first and second telescopic parts to which the corresponding slide shoe is attached.

BRIEF DESCRIPTION OF THE DRAWINGS

Aspects of the invention will be described hereunder with reference to the accompanying drawings.

FIGS. 3 and 4 are perspective views of the telescope in the roof assembly of FIG. 2 in two positions.

FIGS. 5 and 6 show details V and VI in FIG. 3 on a larger scale.

FIGS. 7a-c and 8a-c are cross sectional views according to the lines VII-VII and VIII-VIII, respectively in FIG. 4, showing the height adjusting mechanism in 3 positions.

DETAILED DESCRIPTION OF THE ILLUSTRATIVE EMBODIMENTS

Figure 1:
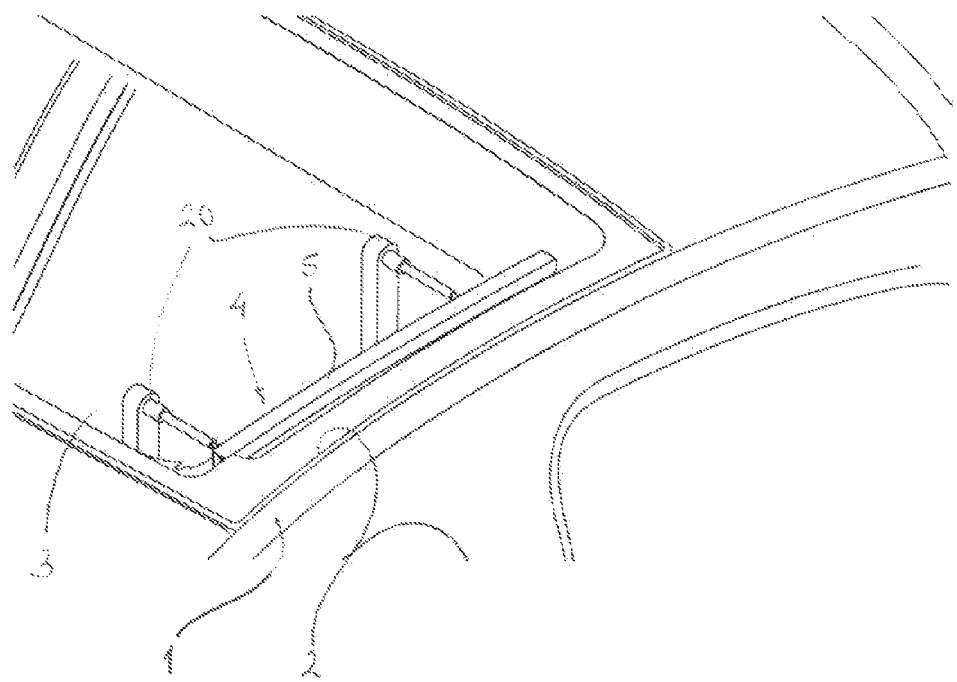
FIG. 1 is a simplified perspective view of a vehicle roof in which a roof assembly is mounted.
Figure 2:
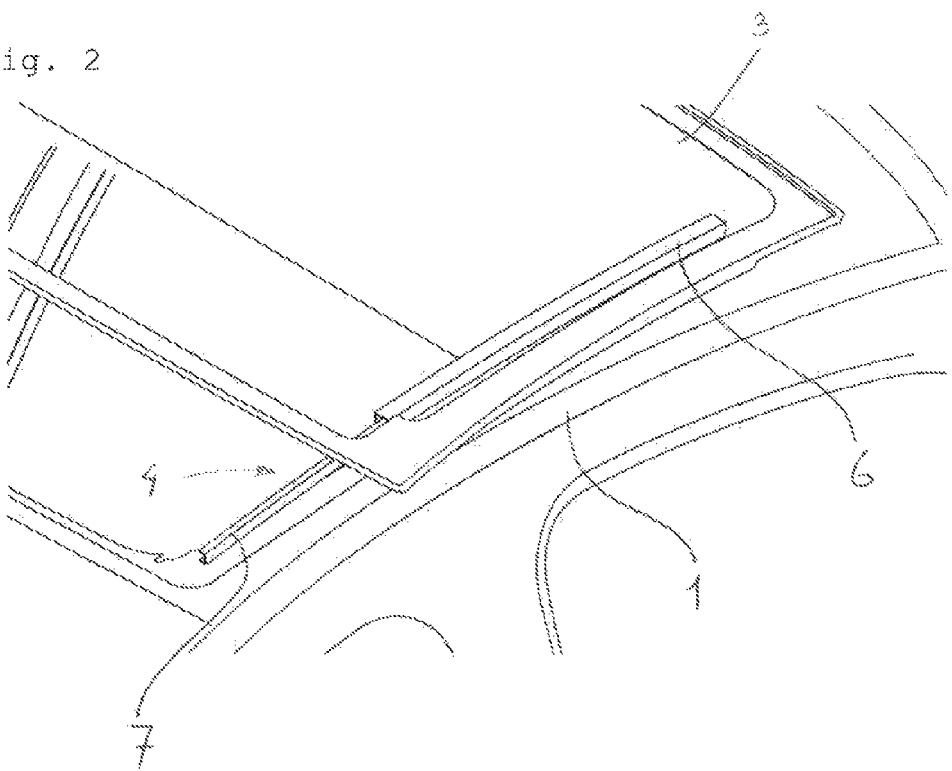
FIG. 2 is a view corresponding to that of FIG. 1 but showing the roof assembly in use in which the panel is in an open position.

FIGS. 1, 2 show a fixed roof 1 of a vehicle, in particular a passenger car, having an opening 2 in its fixed roof 1 to receive a roof assembly. The roof assembly shown is of the telescopic spoiler type, meaning that a panel 3 of the roof assembly is adapted to move from a closed position closing the roof opening 2 (see FIG. 1) to at least to an open position (FIG. 2) rearwardly and upwardly from the closed position.

In the open position, roof panel 3 is positioned above fixed roof 1 of the vehicle or above another (rear) panel of the roof assembly, which may be either fixed or also movable.

The panel 3 of the roof assembly is generally an at least partially transparent glass or plastic rigid panel supported by an operating mechanism 4 near both of its sides which extend substantially parallel to the longitudinal direction of the vehicle. Each operating mechanism 4 includes a telescope 5 comprising a first or outer telescopic part 6 fixed to panel 3 and a second or inner telescopic part 7 attached to the remainder of operating mechanism 4.

The remainder of operating mechanism 4 is not part of the present invention, but an example of such operating mechanism can be found in co-pending U.S. patent application Ser. No. 14/567,529 (US 2015/0165882 A1) the contents of which are incorporated herein by reference thereto in its entirety.

The telescope 5 is used in order to create a relative large roof opening in front of panel 3 when in its open position due to the movement of outer telescopic part 6, while at the same time inner telescopic part 7 only makes a relative small rearward movement, or not even a movement at all. Thus, any guide rails alongside roof opening 2 can be relatively short or even absent.

When the roof assembly is mounted into the vehicle, it is necessary to adjust at least the height of panel 3 in order to position it at the desired height, in particular flush with the surrounding fixed roof 1 when the panel 3 is in its closed position. The height of panel 3 may vary due to tolerances in the roof assembly and/or in fixing points of vehicle roof 1. The correct height is not only important to obtain a high quality appearance of panel 3 in the vehicle, but might also be important to obtain a correct seal, especially if a seal is created in cooperation with fixed roof 1 of the vehicle.

FIGS. 3 and 4 show telescope 5 in an extended position (FIG. 3) and in its retracted position (FIG. 4). The inner telescopic part 7 is in this case formed from a U-shaped metal (steel or aluminium) section turned 90 degrees, such that the open area is oriented towards the interior of telescope 5. The outer telescopic part 6 is a square beam-shaped section of which a portion below inner telescopic part 7 is removed. This allows attachment of inner telescopic part 7 to the remainder of operating mechanism 4. Other cross sectional shapes are conceivable. The telescopic parts 6, 7 may be straight or slightly curved to adopt the longitudinal shape of panel 3.

The telescopic parts 6, 7 are guided with respect to each other by means of a front slide shoe 8 and a rear slide shoe 9. These slide shoes not only slidably guide telescopic parts 6, 7 but also act as a height adjusting mechanism to adjust the height between telescopic parts 6, 7, and therefore, the height of panel 3 which is fixed to outer telescopic part 6. FIGS. 7, 8 show how panel 3 is fixed to outer telescopic part 6, here by an encapsulation 10.

The front slide shoe 8 is attached to outer telescopic part 6, whereas rear slide shoe 9 is attached to inner telescopic part 7. Thus in the closed position of panel 3, the distance between slide shoes 8, 9 is at a maximum, while front slide shoe 8 moves toward rear slide shoe 9 when panel 3 is moved towards its open position. The maximum rearward movement of outer telescopic part 6 is determined by the stable support of two slide shoes 8, 9 which should maintain some distance to each other.

FIGS. 5 and 7 show the structure of rear slide shoe 9. It includes a pivoting pin 11 attached to a vertical wall 12 of inner telescopic part 7. Concentrically with pivoting pin 11 is an inner slide shoe portion 13 having a circular cross section and fitting between horizontal walls 14, 15 of inner telescopic part 7. The rear slide shoe 9 also includes an outer slide shoe portion 16 which has a circular cross section which is eccentric with respect to pivoting pin 11. Thus if rear slide shoe 9 is rotated around pivoting pin 11 eccentric outer slide shoe portion 16 also rotates and the sliding surfaces of this outer slide shoe portion obtains a different height with respect to pivoting pin 11 and therefore with respect to inner telescopic part 7. As horizontal walls 17, 18 of outer telescopic part 6 is supported by the sliding surfaces of the eccentric outer slide shoe portion 16 the height of outer telescopic part 6 may be changed with respect to inner telescopic part 7. As a result, the height of panel 3 can be varied by rotating rear slide shoe 7 (and also the front slide shoe as will be shown later). This will be clear when comparing the various positions in FIGS. 7a,b and c.

In order to be able to rotate rear slide shoe 9, a recess 19 in outer slide shoe portion 16, which is concentric with pivoting pin 11 has a hexagonal shape in which a hexagonal tool of an assembly machine 20 can engage. The rear slide shoe 9 can be fixed in its desired rotational position by means of a nut 21 which may engage with a screw thread on the free end of pivoting pin 11. Another tool of assembly machine 20 may tighten this nut 21, preferably while holding slide shoe 9 in its correct rotational position. The slide shoe is thus tightened against the free edges of horizontal walls 14, 15 of inner telescopic part 7.

FIGS. 3 and 7 show that a hole 22 is formed in a vertical wall 23 of outer telescopic part 6 to allow assembly machine 20 to engage hexagonal recess 19 and nut 21 of rear slide shoe 7 when outer telescopic part 6 is in its front position, which corresponds with the closed position of panel 3 in which the height of panel 3 must be adjusted when necessary.

FIGS. 7a-c also show that a slide pad 24, for example made from of plastic material having good sliding properties, is formed or attached to inner telescopic part 7 at least in the area of and surrounding pivoting pin 11. This slide pad 24 guides outer and inner telescopic parts 6, 7 in horizontal direction together with rear slide shoe 9 sliding against vertical wall 23' of outer telescopic part 6. The slide shoes 8 and 9 will generally also be made of plastic material having the desired sliding properties. To obtain the desired strength, slide shoes 8, 9 may be provided with a metal insert 25 (slide shoe 9) and/or 26 (slide shoe 8, FIG. 8).

FIGS. 6 and 8 show the structure of front slide shoe 8. This slide shoe 8 is provided with an integrated pivoting pin 27 (it is preferably integrated with metal insert 26) adapted to be mounted through a hole 28 in vertical wall 23 of outer telescopic part 6. It has an outer screw thread to cooperate with a nut 29 and it has an inner hexagonal recess 30. The recess 30 and nut 29 are meant to allow the assembly machine 20 to rotate and fix front slide shoe 8 in its correct rotational position. An outer slide shoe portion 31 is concentric with pivoting pin 27 and fits between horizontal walls 17, 18 of outer telescopic part 6. An inner slide shoe portion 32 fits between horizontal walls 14, 15 of inner telescopic part 7 and is eccentric with pivoting pin 27. The eccentricity is size e in FIGS. 7a and 7c, so that the maximum height adjustment is 2*e.

Thus, this front slide shoe 8 is pivotable with respect to outer telescopic part 6 to adjust the height of panel 3 and is then fixed to this outer telescopic part 6 by means of nut 29. The inner slide shoe portion 13 will then slide with respect to inner telescopic part 7. With this front slide shoe 8, a slide pad 33 is formed on or fixed to vertical wall 23' of outer telescopic part 6 so that slide pad 33 moves along with front slide shoe 8. It is generally sufficient to have such slide pads 24, 33 only in the area of slide shoes 8, 9, but it is also possible to provide it along a greater length. The attachment may require additional machining operations, for example drilling holes in e.g. vertical walls 23, 23' when slide pads 24, 33 are formed by encapsulation, and for this reason the size of the slide pads will normally be minimized to save cost.

From the above it will be clear that the invention provides a telescope and height adjusting mechanism for a roof assembly which is simple and may lead to a compact design minimizing the package height.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims. For example, it would be possible that the telescopic parts and/or slide shoes are shaped and/or positioned differently.

What is claimed is:

1. A roof assembly for a vehicle, having a roof opening in its fixed roof, comprising:
    a frame,
    at least one movable panel closing said roof opening in its closed position and being movable from said closed position rearwardly and up-wardly above the fixed roof, and
    a driven operating mechanism which is supported by the frame and supports the panel, the operating mechanism comprising a telescope including a first telescopic part attached to the panel and a second telescopic part attached to a remainder of the operating mechanism, a height adjusting mechanism being provided between the panel and the operating mechanism, wherein the height adjusting mechanism is arranged and adjusts the height between the first and second telescopic parts.

2. The roof assembly of claim 1, wherein the first telescopic part is guided with respect to the second telescopic part by at least one slide shoe, the height position of the slide shoe with respect to one of the telescopic parts being adjustable.

3. A roof assembly for a vehicle, having a roof opening in its fixed roof, comprising:
    a frame,
    at least one movable panel closing said roof opening in its closed position and being movable from said closed position rearwardly and upwardly above the fixed roof, and
    a driven operating mechanism which is supported by the frame and supports the panel, the operating mechanism comprising a telescope including a first telescopic part attached to the panel and a second telescopic part attached to a remainder of the operating mechanism, a height adjusting mechanism being provided between the panel and the operating mechanism, wherein the height adjusting mechanism is arranged and adjusts the height between the first and second telescopic parts, wherein the first telescopic part is guided with respect to the second telescopic part by at least one slide shoe, the height position of the slide shoe with respect to one of the telescopic parts being adjustable, and wherein the at least one slide shoe includes a pivoting axis and eccentric sliding surfaces to adjust the height.

4. The roof assembly of claim 2, wherein the first and second telescopic parts include a first and second slide shoe, the first slide shoe being attached to the first telescopic part, and the second slide shoe being attached to the second telescopic part.

5. The roof assembly of claim 4, wherein first telescopic part is an outer telescopic part and the second telescopic part is an inner telescopic part, the first slide shoe being the front slide shoe attached to the outer telescopic part and the second slide shoe being the rear slide shoe attached to the inner telescopic part.

6. The roof assembly of claim 5, wherein the second telescopic part is a U-shaped section turned 90 degrees with an open area of the section oriented toward an interior of the telescope, and wherein the first telescopic part is extending outwardly of the second telescopic part, the first and second slide shoes being positioned between the open area of the second telescopic part and the first telescopic part.

7. The roof assembly of claim 3, wherein the at least one slide shoe comprises a circular outer circumference having a transverse axis which is positioned eccentrically with respect to the pivoting axis of the eccentric slide shoe.

8. The roof assembly of claim 3, wherein the at least one slide shoe is adjusted by a first tool and is secured by a second tool of an assembly machine.

9. The roof assembly of claim 5, wherein at least one slide pad is provided between the first and second telescopic part.

10. The roof assembly of claim 9, wherein there is provided a slide pad only in the areas of the first and second slide shoes, each slide pad being attached to one of the first and second telescopic part to which the corresponding slide shoe is attached.

11. The roof assembly of claim 1, wherein the height adjusting mechanism is arranged side-by-side with at least the second telescopic part.

12. The roof assembly of claim 11 wherein the height adjusting mechanism is arranged below an upper portion of the first telescopic part of the telescope.

13. The roof assembly of claim 1, wherein the operating mechanism is slidably guided in a guide rail extending in longitudinal direction of the roof assembly.

14. The roof assembly of claim 11, wherein the height adjusting mechanism is arranged below an upper portion of the first telescopic part of the telescope.

15. A roof assembly for a vehicle, having a roof opening in its fixed roof, comprising:
    a frame,
    at least one movable panel closing said roof opening in its closed position and being movable from said closed position rearwardly and upwardly above the fixed roof, and
    a driven operating mechanism which is supported by the frame and supports the panel, the operating mechanism comprising a telescope including a first telescopic part attached to the panel and a second telescopic part attached to a remainder of the operating mechanism, the first and second telescopic parts being slidable with respect to each other in order to move the movable panel with respect to the second telescopic part for opening and closing the movable panel, a height adjusting mechanism being provided between the panel and the operating mechanism, wherein the height adjusting mechanism is arranged and adjusts the height between the first and second telescopic parts.

16. The roof assembly of claim 15 wherein the height adjusting mechanism is arranged and adjusts the height between the first and second telescopic parts during mounting of the roof assembly into the vehicle.

\* \* \* \* \*